May 20, 1952 W. F. DUKES, JR 2,597,079
DISK TILLER
Filed June 17, 1950 2 SHEETS—SHEET 2
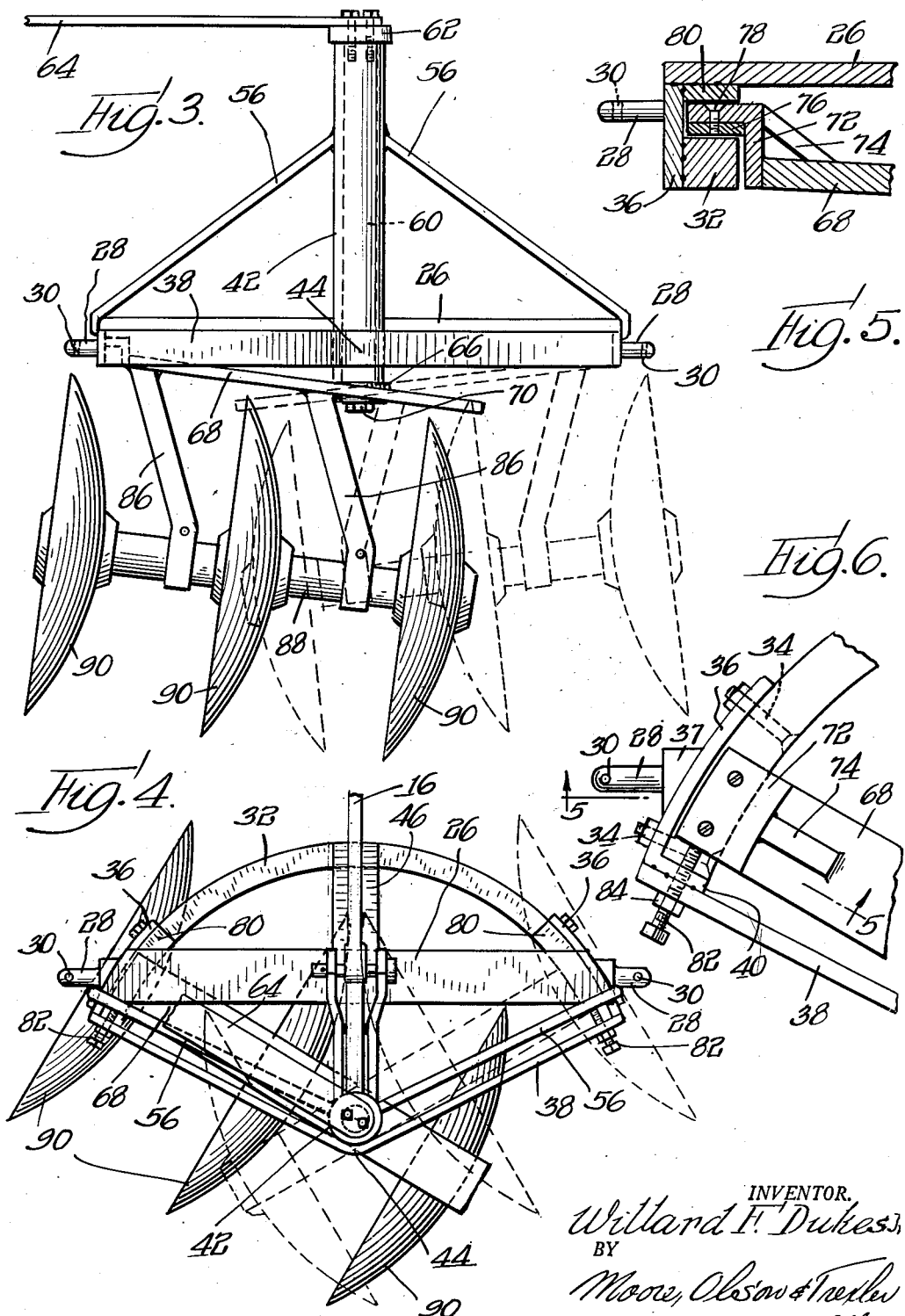
INVENTOR.
Willard F. Dukes,
BY
Moore, Olson & Trexler
Attys.

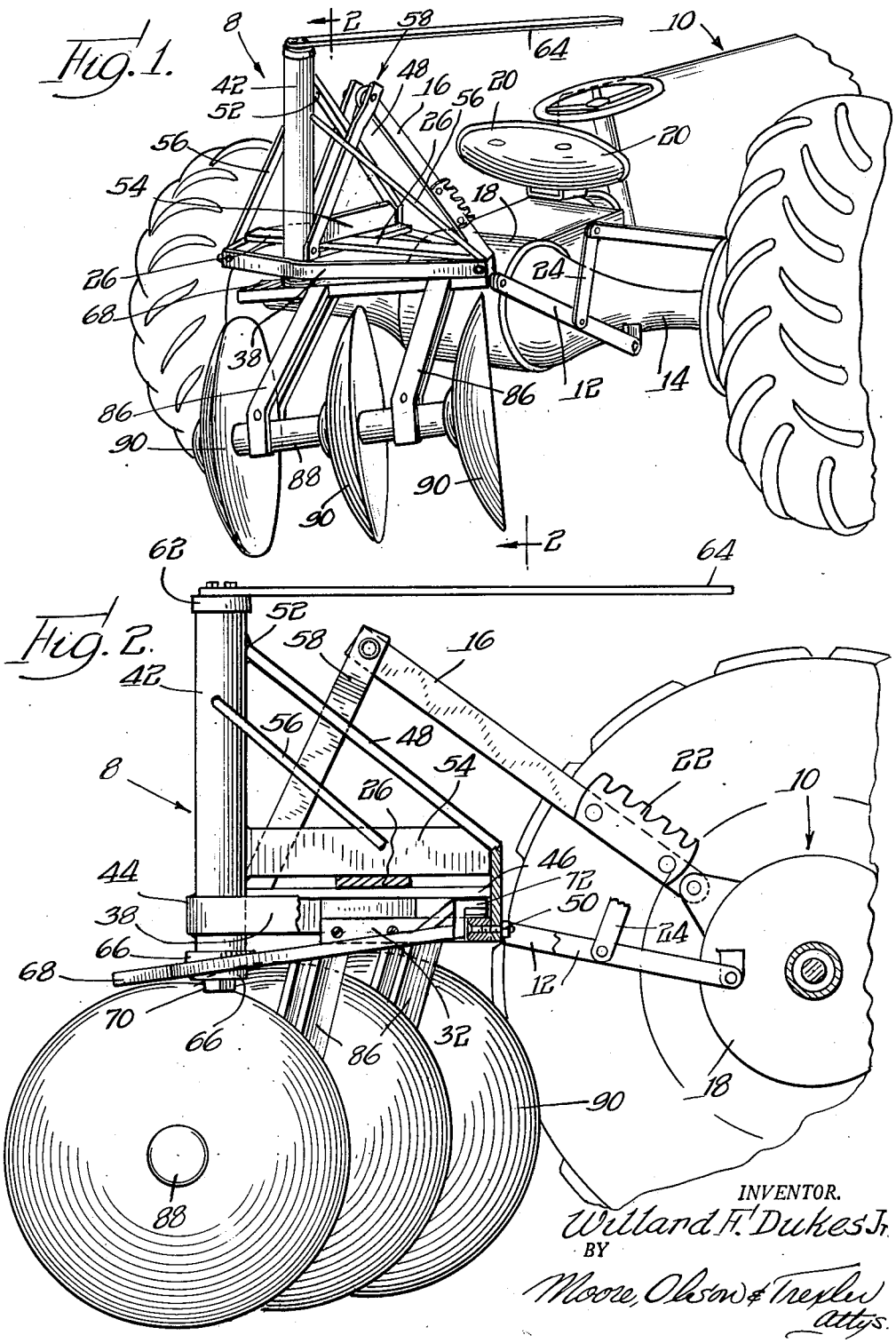

Patented May 20, 1952

2,597,079

UNITED STATES PATENT OFFICE 2,597,079

DISK TILLER

Willard F. Dukes, Jr., Quitman, Ga.

Application June 17, 1950, Serial No. 168,687

2 Claims. (Cl. 97—30)

This invention is concerned with a tiller and more particularly with a disc tiller to be attached to the rear of a tractor or the like.

Disc tillers to be drawn by tractors or the like generally comprise a series of discs mounted on one or more axles and are arranged to be drawn along the ground with the axles, and hence the discs, at an oblique angle relative to the direction of motion. The soil is thus turned up and displaced to one side. The soil is displaced in one direction when the tiller is advanced over a field in one direction and is displaced in the opposite direction when the tiller is advanced over the field in an opposite direction. Thus a small valley or dead furrow is left at each junction between areas tilled or harrowed in opposite directions.

Hillside or terraced land when it is broken up by plowing, harrowing, or other means has a tendency to sift down hill under the action of gravity. This is obviously an undesirable occurrence and the valuable top soil is gradually lost from the cultivated field.

An important object of this invention is the provision of a reversible tiller of the disc type whereby soil is shifted in the same direction for opposite directions of travel of the tiller whereby dead furrows are eliminated and the downhill drifting of soil can be counteracted.

A further object of this invention is the provision of a reversible tiller which readily can be reversed from the seat of the tractor drawing the tiller.

An ancillary object is the provision of an adjustable tiller wherein the oblique angle of the tiller discs relative to the direction of travel readily may be adjustably preset.

Another object of this invention resides in the provision of a reversible tiller which may be lifted from the ground by the conventional power lift of a tractor with which it is utilized.

In traversing a field in opposite directions with a tiller, it is common practice to overlap the areas tilled slightly. This results in a supporting wheel, which for example may be a wheel of the towing tractor, riding in a furrow at a lower elevation than a similar wheel on the other side which rides on ground which is yet untilled. Accordingly, the discs on the lower side tend to bite more deeply into the ground and an uneven job results.

An object of this invention is the provision of a tiller in which the disc axle is tilted relative to supporting structure therefor in order that all of the discs will bite into the ground equally.

A further object of this invention is the provision of a reversible tiller in which the disc axle is tilted relative to supporting structure therefor and the tilting angle is reversed simultaneously with the reversal of the discs to insure an equal bite into the ground by all of the discs.

Other and further objects and advantages of this invention will be apparent from the following description when taken in conjunction with the accompanying drawings in which:

Figure 1 is a perspective view showing a tiller embodying the principles of my invention secured to a tractor;

Figure 2 is a side view partly in section taken substantially along the line 2—2 of Fig. 1 with the tiller substantially in the mid position of a reversing operation and certain parts being broken away for clarity of illustration;

Figure 3 is a rear view of the tiller;

Figure 4 is a top view;

Figure 5 is a detailed sectional view taken along the line 5—5 of Figure 6; and

Figure 6 is a detail view showing the connection of the swinging end of the reversing mechanism.

In Figs. 1 and 2 there is shown a tiller generally designated as 8 secured to any conventional tractor 10 by a three point hitch including draw bars 12 pivotally connected to the axle housing 14 and a center hitch link 16 connected to the central portion 18 of the axle housing directly behind the seat 20 of the tractor. The draw bars and center hitch link are of substantially conventional construction, the center hitch link having suitable mechanism 22 for adjusting its length and the draw bars 12 having conventional elevating mechanism 24 secured to them.

The tiller 8 comprises a flat steel main bar or cross member 26 having pivot pins 28 extending from each end thereof and received in apertures in the draw bars 12. Diametral bores 30 are provided near the outer ends of the pins 28 to receive cotter pins or other structure preventing disengagement of the pins 28 and draw bars 12. A C-shaped guide bar 32 is secured as by bolts 34 to a pair of guide plates 36 (Figs. 5 and 6) welded to the ends of the main bar 26. As may be seen in Fig. 6, the pivot pins 28 are not secured directly to the main bar 26 but to substantially wedge shaped blocks 37 welded to the guide plates 36. A V-shaped brace 38 has its end welded to a flange 40 forming a part of the guide plates 36.

A hollow upstanding column or pivot housing 42 is welded to the V-shaped brace 38 at the apex 44 thereof. A flat steel longitudinal support bar 46 is welded to the pivot housing 42 and extends forwardly beneath the main bar 26 to which it is welded to a point above the C-shaped guide bar 32. A center brace 48 extends directly upwardly from the foremost portion of the C-shaped guide bar to which it is secured as by bolts 50 past the front end of the longitudinal support bar 46 to which it is welded and from a short distance above the longitudinal support bar 46 extends upwardly and rearwardly to a point near the top of the column 42 where it is welded at 52. Further longitudinal support and bracing is provided by a longitudinal brace 54 having an angular leading edge welded to the angularly disposed portions of the center brace 48 and to the pivot housing 42. To provide utmost strength and rigidity, the longitudinal support bar 46 has its widest cross sectional dimension in a horizontal plane while the longitudinal brace 54 has its widest cross sectional dimension disposed in a vertical plane. The longitudinal brace 54 lies across the top of the main bar 26 and is welded thereto.

Further strength and rigidity is imparted to the structure by diagonal braces 56 welded to the guide plates 36 at the ends of the main bar 26 and to the pivot housing 42 near the top thereof. A center connector 58 extends diagonally upwardly and frontwardly from the junction of the longitudinal support bar 46 and the pivot housing 42 and comprises a pair of spaced apart bars passing on either side of the longitudinal brace 54 and the center brace 48. The bars are welded to the pivot housing 42, to the longitudinal support bar 46, to the longitudinal brace 54, and to the center brace 48 to provide great strength and rigidity. Aligned apertures are provided in the upstanding end of the bars comprising the center connector 58 for connection by a pin to the hitch link 16 and if desired the center connector may be enlarged at this position and a plurality of apertures may be provided for closer control of the connection between the tiller and the hitch link 16.

A pivot shaft 60 is mounted within the pivot housing 42 and is secured against downward movement therein by a cap 62 secured by bolts passing through a pivot handle 64 and the cap 62 into the top of the pivot shaft 60. For greatest strength and rigidity the handle 64 additionally may be welded to the cap 62 if desired. A depending peripheral flange on the cap 62 encircles the top of the pivot housing 42 and prevents the entrance of dirt or water. The bottom end of the pivot shaft 60 extends to or just slightly below the bottom of the pivot housing 42 and is ground to provide a plurality of striae. The top surface of a pair of wedges 66 is similarly ground to provide striae cooperating with those on the bottom surface of the pivot shaft to prevent relative rotation of the pivot shaft and the wedges when the top surface of the wedges is clamped against the bottom of the pivot shaft. A disc supporting bar 68 is welded between the wedges 66 near one end of the bar. A bolt 70 passes through a bore in the wedges and the disc supporting bar 68 and is threaded into the lower end of the pivot shaft 60 to clamp the wedges and bar to the bottom end of the pivot shaft. The disc supporting bar 68 is substantially aligned with the handle 64 and is fixed for rotation with the handle and pivot shaft by the cooperating stria on the bottom of the pivot shaft and on the top surface of the wedges.

The outer end of the disc supporting bar 68 is provided with an angle bracket 72 (Figs. 2, 5 and 6) welded to the end of the disc supporting bar and braced by a diagonal brace 74 welded to the angle bracket 72 and the disc supporting bar 68. The horizontal flange of the angle bracket 72 overlies the C-shaped guide bar 32 and has a bearing member 76 secured to it by screws 78. The bearing member 76 rests atop the C-shaped guide bar 32 to support the outer end of the disc supporting bar 68. Upward movement of the bar 68 is prevented by arcuate flanges 80 welded to the top edges of the guide plates 36 and the angle flanges 40 of these guide plates, the overlying flanges 80 being substantially coextensive with the guide plates 36. In Fig. 6 the overlying flanges 80 as well as all parts thereabove have been omitted for clarity of illustration. Bolts 82 are threaded through the V-shaped brace 38 and the flanges 40 of the guide plates 36 to abut the end of the disc supporting bar 68 and thereby determine its position. Jam nuts 84 may be provided on the bolts 82 if desired to lock the bolts in adjusted position.

A pair of disc supports 86 extend downwardly at an angle from the disc supporting bar 68 to carry the disc supporting axle 88 which in the current illustration carries three of the usual concavo-convex discs 90. Each of the disc supports 86 comprises a pair of spaced bars welded at their top ends to the disc supporting bar 68 and welded or bolted at their bottom ends to bearing members on the disc axle 88. Due to the wedges 66, the disc supporting bar 68 is carried at a slight angle to the horizontal and the disc axle is carried parallel to the disc supporting bar 68 at the same angle to the horizontal.

By shifting the pivot handle 64, which may be done without dismounting from the tractor seat 20, the discs and their supporting structure may be placed in either of the two adjusted positions shown in full and in dashed lines in Figs. 3 and 4. (Fig. 2 shows a mid-position during adjustment.) To till a field, the discs and supporting structure are placed in either position such as that shown in full lines in Figs. 3 and 4. In this position the discs turn or throw soil to the left. When plowing on a hillside, this should be uphill to counteract the natural drifting of soil due to gravity.

When the tractor and tiller have traversed the field from one end to the other, the tractor is turned around, the tiller being lifted from the ground by the conventional power lift if desired, and the discs and supporting structure are reversed to the position shown in Fig. 1 and in dotted lines in Figs. 3 and 4 by shifting the handle 64.

During the shifting of the discs and supporting structure from one position to the other the bearing member 76 secured to the angle bracket 72 at the end of the disc supporting bar 68 moves along the top surface of the C-shaped guide bar 32 and is supported thereby. In Fig. 2 the discs and supporting structure are shown at the midway position as they are being shifted with the movable end of the disc supporting bar 68 supported by the C-shaped guide bar 32. In either position of adjustment, the angle of the discs relative to the direction of movement of the tractor is determined by the setting of the bolts 82 and upward movement of the movable end of the disc supporting bar is prevented by one of the overlying flanges 80. It is apparent that no structure need be provided to hold the disc supporting bar 68 against either of the bolts 82 as the resistance of the earth being tilled tends to rotate the disc supporting bar 68 and force it against whichever of the bolts 82 it is in contact with.

After the discs have been reversed to the position shown in Fig. 1, and shown in dashed lines in Figs. 3 and 4, the field is traversed in a direction opposite to that previously traveled. Although the discs are now reversed relative to a tractor and the supporting framework of the tiller, their position is such that soil is turned or thrown in the same direction to counteract downhill drifting and to prevent dead furrows.

At the same time the angle of the discs relative to the direction of motion is reversed, the angle of tilt of the disc axle and supporting bar relative to the horizontal portion of the tiller frame is reversed. Thus the disc axle is maintained in horizontal position when either rear tractor wheel is lowered by traveling in a furrow.

Due to the particular configuration of the disc supporting structure, the discs are substantially centralized behind the tractor, thus simplifying tracking of the discs and steering of the tractor.

Although a particular form of my invention has been shown and described, it is apparent that many changes can be made in the specified structure without departing from the principles of the invention. Therefore it is to be understood that the invention is to be limited only by the ensuing claims.

I claim:

1. A tiller comprising a hollow upstanding column, an arcuate support, means for supporting said column along the axis of said arcuate support, a plurality of discs, supporting structure for said discs, a pivotal shaft in said column, means for securing said disc supporting structure to said pivotal shaft, means for supporting said movable support on said arcuate support, a handle on said pivotal shaft to pivot said shaft and thereby adjust the angular position of said discs, a cross member secured substantially along a chord of said arcuate support, a pivotal connection at each end of said cross member, and a pivotal connection extending forwardly of said upstanding column, said pivotal connections being adapted to be attached to a conventional three point tractor hitch.

2. A tiller comprising a hollow upstanding column, an arcuate support, means for supporting said column along the axis of said arcuate support, a plurality of discs, supporting structure for said discs, a pivotal shaft in said column, means for securing said disc supporting structure to said shaft including a wedge interposed between said disc supporting structure and said shaft to position said supporting structure at an oblique angle relative to said shaft, a bearing member for supporting said disc supporting structure slidingly along said arcuate support, adjustable stop means adjacent each end of said arcuate support to limit said bearing member and thereby determine the position of said discs, a flange on said arcuate support substantially at each end thereof and adapted to overlie said bearing member and prevent upward movement thereof, and a handle on said shaft to pivot said shaft and thereby determine the angular position of said discs.

WILLARD F. DUKES, Jr.

REFERENCES CITED

The following references are of record in the file of this patent:

UNITED STATES PATENTS

| Number | Name | Date |
|---|---|---|
| 1,023,704 | Abbott | Apr. 17, 1912 |
| 1,127,179 | Brown | Feb. 2, 1915 |
| 1,740,874 | Polhemus | Dec. 24, 1929 |
| 2,123,555 | Morkovski | July 12, 1938 |
| 2,320,624 | Love | June 1, 1943 |

FOREIGN PATENTS

| Number | Country | Date |
|---|---|---|
| 18,176 | Australia | of 1929 |
| 103,796 | Australia | May 5, 1938 |